(12) United States Patent
Jeong et al.

(10) Patent No.: US 9,632,607 B2
(45) Date of Patent: Apr. 25, 2017

(54) MOBILE TERMINAL AND METHOD OF CONTROLLING THE MOBILE TERMINAL

(71) Applicant: LG ELECTRONICS INC., Seoul (KR)

(72) Inventors: Byoungzoo Jeong, Seoul (KR); Hoon Heo, Seoul (KR); Jaeho Choi, Seoul (KR); Kyogu Lee, Seoul (KR); Hanwook Chung, Seoul (KR); Dooyong Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 14/157,190

(22) Filed: Jan. 16, 2014

(65) Prior Publication Data

US 2014/0253478 A1 Sep. 11, 2014

(30) Foreign Application Priority Data

Mar. 8, 2013 (KR) .......................... 10-2013-0025264

(51) Int. Cl.
    G06F 3/16 (2006.01)
    G06F 3/041 (2006.01)
    G06F 3/01 (2006.01)
    G06F 3/0488 (2013.01)

(52) U.S. Cl.
    CPC .............. G06F 3/041 (2013.01); G06F 3/016 (2013.01); G06F 3/04883 (2013.01); G06F 3/16 (2013.01); G06F 3/167 (2013.01)

(58) Field of Classification Search
    CPC G10L 13/08; G08B 6/00; C06F 3/033; G09G 5/00; G06F 3/016; G06F 3/15
    See application file for complete search history.

(56) References Cited

U.S. PATENT DOCUMENTS

| | | | |
|---|---|---|---|
| 5,627,348 A | 5/1997 | Berkson et al. ................. 178/18 |
| 2003/0067450 A1 | 4/2003 | Thursfield et al. ........... 345/173 |
| 2007/0088547 A1* | 4/2007 | Freedman ............... G10L 13/08 704/235 |
| 2010/0090815 A1 | 4/2010 | Yamaya ..................... 340/407.2 |
| 2011/0320204 A1 | 12/2011 | Locker et al. ................ 704/260 |
| 2012/0127088 A1* | 5/2012 | Pance ..................... G06F 3/016 345/173 |
| 2014/0043242 A1* | 2/2014 | Dietz ...................... G06F 3/016 345/173 |

FOREIGN PATENT DOCUMENTS

| | | |
|---|---|---|
| EP | 2 098 946 A1 | 9/2009 |
| WO | WO 96/31857 A1 | 10/1996 |
| WO | WO 03/027822 A2 | 4/2003 |

* cited by examiner

*Primary Examiner* — Tony N Ngo
(74) *Attorney, Agent, or Firm* — Ked & Associates, LLP

(57) ABSTRACT

A mobile terminal and a method of controlling the mobile terminal are disclosed. According to the embodiment of the present invention, when a touching event for a touch input to a touch screen is generated, a writing sound source corresponding to the generated touching event is selected from a memory, and a feedback sound is output in real time, that is generated by changing a sound property of the writing sound source that is selected according to a pressure of a touch applied to the touch screen and a moving speed of the touch. This enables the user to feel as if he/she performed the writing input in the actual analog environment, and provides the use with a yearning for the analog environment and a pleasure to experience it.

17 Claims, 13 Drawing Sheets

MOBILE TERMINAL AND METHOD OF CONTROLLING THE MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2013-0025264 filed on Mar. 8, 2013, the contents of which is incorporated by reference herein in its entirety.

BACKGROUND

1. Field

The present invention relates to a mobile terminal that is capable of outputting a sound that corresponds to a touch input and a method of controlling the mobile terminal.

2. Background

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Various attempts have been made to implement complicated functions in such a multimedia device by means of hardware or software.

In a case of a mobile terminal equipped with a touch screen, the touch screen can be used as an input device as well as an output device. When the touch screen is used as the input device in such a manner, a predetermined effect sound can be output according to a touch applied to the touch screen.

SUMMARY OF THE DISCLOSURE

Therefore, an aspect of the detailed description is to provide a mobile terminal that is capable of providing a user with a prompt feedback sound on various touch inputs and a sense of reality as in an analog environment by outputting a sound corresponding to a touch applied to a touch screen in real time and a method of controlling the mobile terminal.

To achieve these and other advantages and in accordance with the purpose of this specification, as embodied and broadly described herein, there is provided a mobile terminal including a touch screen configured in such a manner that a touch for writing input is possible, an audio output module that outputs a sound according to the writing input, and a controller.

Here, when a predetermined touching event is generated on the touch screen, the controller selects a writing sound source corresponding to the generated touching event, from a memory, while the writing input is performed, the controller changes a first property of the selected writing sound source according to a pressure of the touch applied to the touch screen, and the controllers changes at least one of the first property and a second property of the selected writing sound source according to a moving speed of the touch applied to the touch screen, and thus generates the sound.

In the mobile terminal, the predetermined touching event may be one of a touching-down event, a touching and moving event, and a touching-up event, and the controller may select a different writing sound source from memory according to the generated touching event.

In the mobile terminal, in a case where the touching event is the touching-down event, the controller may select the writing sound source corresponding to the touching-down event, and when the touching-down event is generated, the controller may change a property representing a volume of the selected writing sound source according to the pressure of the touch applied to the touch screen, thereby generating the sound.

In the mobile terminal, in a case where the touching event is the touching-down event, the controller may select the writing sound source corresponding to the touching-down event, and when the touching-down event is generated, the controller may change a property representing a tone of the selected writing sound source according to an area of the touch applied to the touch screen, thereby generating the sound.

In the mobile terminal, in a case where the touching event is the touching and moving event, the controller may select the writing sound source corresponding to the touching and moving event, may change a property representing a tone of the selected writing sound source according to the pressure of the touch applied to the touch screen, and may change at least one of properties representing a pitch and a volume of the selected writing sound source according to the moving speed of the touch applied to the touch screen, thereby generating the sound.

In the mobile terminal, in a case where the touching event is the touching-up event, the controller may select the writing sound source corresponding to the touching-up event, and may change a property representing a volume of the selected writing sound source according to a speed at which the touch is released from the touch screen, thereby generating the sound.

In the mobile terminal, in a case where the touching event is the touching-up event, the controller may select the writing sound source corresponding to the touching-up event, and may change a property representing a tone of the selected writing sound source according to an area of the touch applied immediately before the touch is released from the touch screen, thereby generating the sound.

In the mobile terminal, the first property may be a property that represents a volume of the writing sound source, and, when the pressure of the touch is increased, the controller may increase a value of the first property, and, when the pressure of the touch is decreased, the controller may decrease the value of the first property.

In the mobile terminal, the second property may be a property that represents a tone or a pitch of the writing sound source, and, when the pressure and the moving speed of the touch are increased, the controller may increase values of the first property and the second property, when the moving speed of the touch is increased/decreased, the controller may increase/decrease at least one of the values of the first property and the second property, and, when the pressure and the moving speed of the touch are decreased, the controller may decrease the values of the first property and the second property at the same time.

In the mobile terminal, while the writing input is performed, the controller may generate the sound in real time and may provide the audio output module with the generated sound.

In the mobile terminal, the controller may include a writing input mode setting unit that sets at least one of a writing tool for the writing input, and a background screen according to a predetermined reference.

In the mobile terminal, the memory may store in advance the generated writing sound sources, the number of which is proportional to the number of the set writing tools and the set background screens.

In the mobile terminal, when the predetermined touching event is generated on the touch screen, the controller may select the different writing sound sources from the memory, according to the set writing tool and the set background screen.

In the mobile terminal, when at least one of the writing tool and the background screen is set differently, the touch screen may output a visual effect of the touch for the writing input differently, and the controller may change at least one property of the selected writing sound source differently according to an area, the pressure, and the moving speed of the touch when the set writing tool touches on the background screen.

In the mobile terminal, in a case where a thickness of the set writing tool varies according to a writing pressure, the controller may provide an output to the touch screen by adjusting the thickness of the writing input according to the pressure of the touch when the set writing tool touches on the touch screen while the writing input is performed, and may generate the sound by changing a property representing a tone of the selected writing sound source.

In the mobile terminal, when the pressure of the touch applied to the touch screen is increased, the controller may change the tone by strengthening a sound in a low band in the selected writing sound source, and, when the pressure of the touch applied to the touch screen is decreased, the controller may change the tone by strengthening a sound in a mid band or in a high band in the selected writing sound source.

In the mobile terminal, if an amount of a virtual frictional force that is generated when the set writing tool comes into contact with the set background screen is changed, the controller may generate the sound by changing the property of the selected writing sound source differently or by applying a predetermined effect sound to the selected writing sound source.

In the mobile terminal, the controller may output a vibration effect corresponding to the amount of the virtual frictional force to the touch screen.

In the mobile terminal, the controller may include a signal conversion unit for converting a user voice signal, input through a microphone installed in the mobile terminal, to a signal corresponding to the touch for the writing input.

In the mobile terminal, the controller may change the property of the selected writing sound source by changing the pressure of the touch applied to the touch screen according to a size of the input user voice signal and changing the moving speed of the touch applied to the touch screen according to a speed at which the user voice signal is input.

In the mobile terminal, the controller may overlap a background effect sound according to a predetermined reference on the generated sound, and may output the result to the audio output module.

To achieve these and other advantages and in accordance with the purpose of this specification, as embodied and broadly described herein, there is also provided a method of controlling a mobile terminal, including detecting a predetermined touching event that is generated on a touch screen configured in such as manner that a touch for writing input is possible, selecting a writing sound source corresponding to the generated touching event from a memory, changing a first property of the selected writing sound source according to a pressure of the touch applied to the touch screen while the writing input is performed, changing at least one of the first property and a second property of the selected writing sound source according to a moving speed of the touch applied to the touch screen while the writing input is performed, and outputting the writing sound source in real time.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein.

DETAILED DESCRIPTION

Hereinafter, a mobile terminal of the present disclosure will be explained in more detail with reference to the attached drawings. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
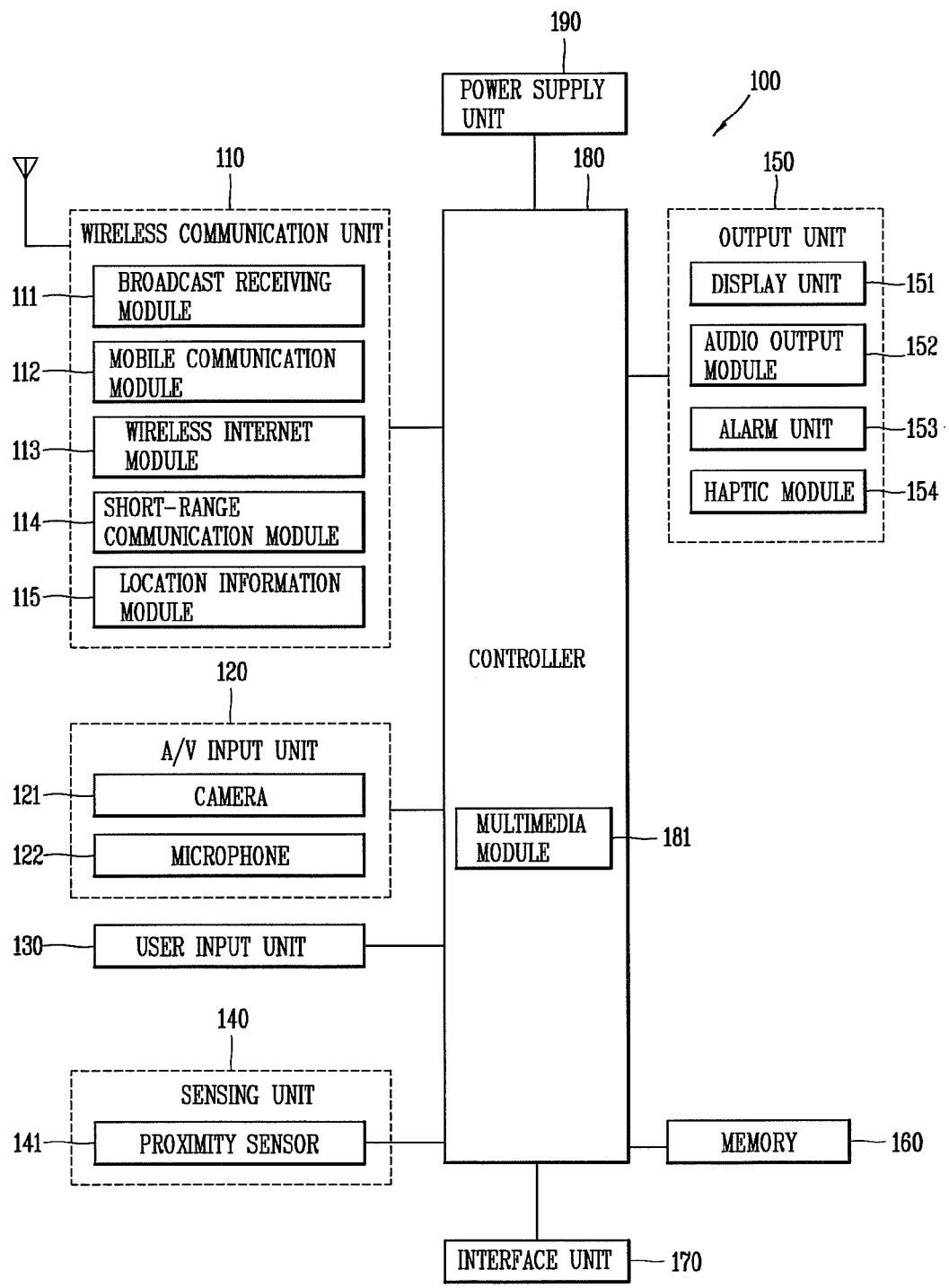
FIG. 1 is a block diagram illustrating a mobile terminal according to one embodiment of the present invention.

Referring to FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a prescribed part of the display unit 151, or a capacitance occurring from a prescribed part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

In addition, the controller 180 searches a memory for a writing sound source corresponding to a predetermined touching event that is generated on a touch screen, and detects a touch point, a touch pressure, a touch area, touch proximity, a moving speed and the like of the touch applied to the touch screen, and thus changes a volume, a tone, and a pitch (the highness or lowness of a sound) and the likes of the searched-for writing sound source.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
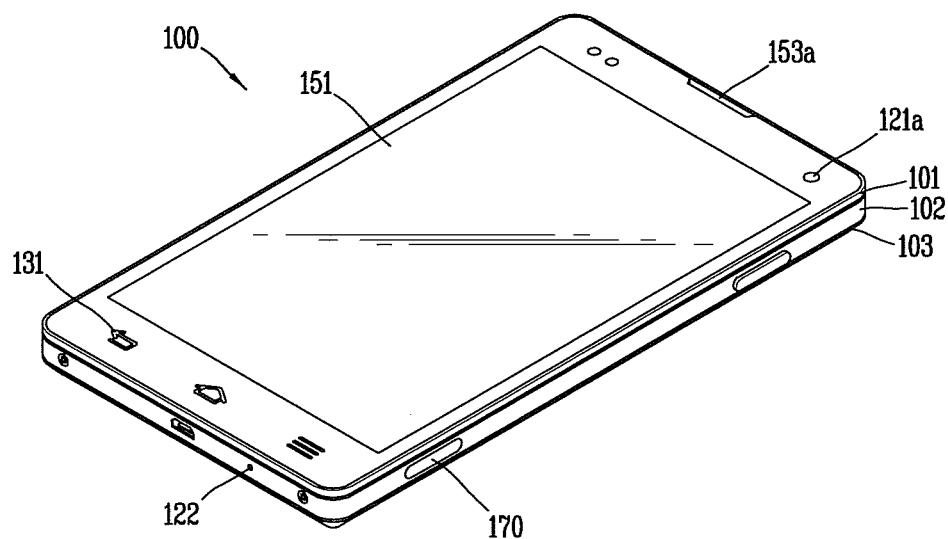
FIG. 2A is a perspective view illustrating a mobile terminal according to one embodiment of the present invention when viewed from front.
Figure 2B:
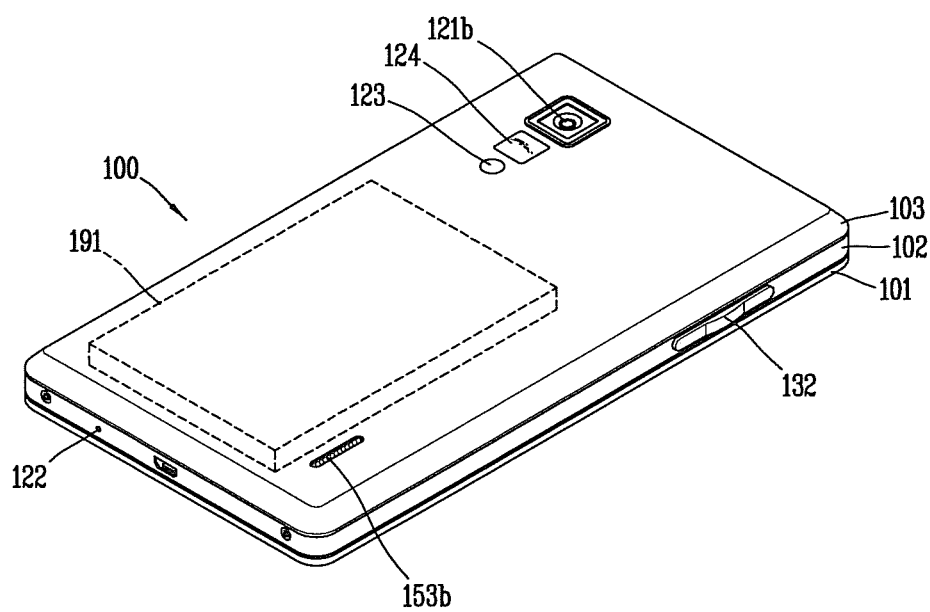
FIG. 2B is a perspective view illustrating the mobile terminal of FIG. 2A when viewed from rear.
Figure 3:
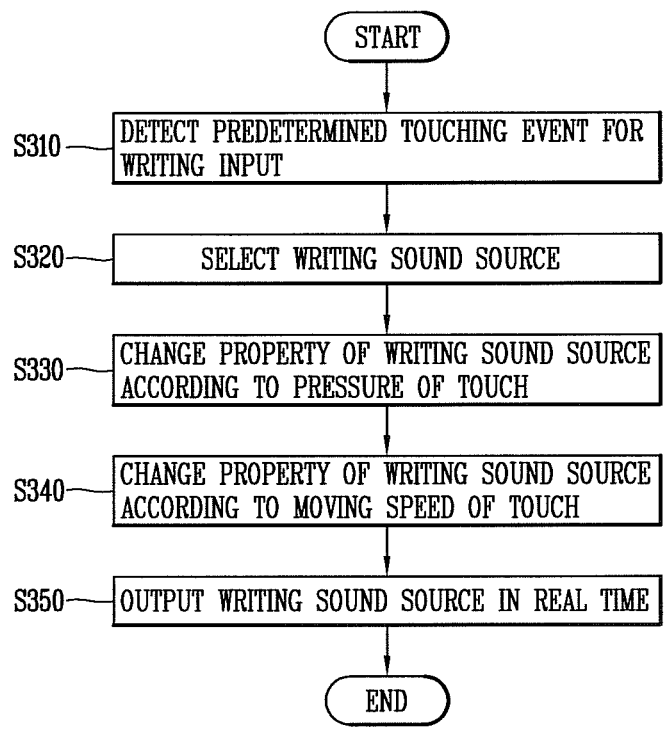
FIG. 3 is a flowchart for describing a method of outputting a feedback sound corresponding to a touch for writing input according to the embodiment of the present invention.

FIG. 2A is a front perspective view of the mobile terminal according to one embodiment of the present invention, and FIG. 2B is a rear perspective view of the mobile terminal according to one embodiment of the present invention.

Referring to FIGS. 1, 2A and 2B, the mobile terminal 100 according to the present disclosure is provided with a bar type terminal body. However, the present disclosure is not limited to this, but may be applied to a slide type in which two or more bodies are coupled to each other so as to perform a relative motion, a folder type, or a swing type, a swivel type and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The terminal body comprises a case (casing, housing, cover, etc.) which forms the appearance of the mobile terminal. The case may include a front case 101, a rear case 102, and a battery cover 203 for covering the rear case 102 and forming the appearance of the terminal body. A space formed by the front case 101 and the rear case 102 may accommodate various components therein. Such cases may be formed by injection-molded synthetic resin, or may be formed using a metallic material such as stainless steel (STS) or titanium (Ti).

On the front surface of the terminal body, may be disposed a display 151, a first audio output unit 152, a user input unit 131 and a front camera 121.

The display 151 includes a liquid crystal display (LCD) module, organic light emitting diodes (OLED) module, e-paper, etc., each for visually displaying information. The display 151 may include a touch sensing means for inputting information in a touch manner. Hereinafter, the dsipaly 151 including the touch sensing means is called a 'touch screen'. Once part on the touch screen 151 is touched, content corresponding to the touched position is input. The content input in a touch manner, may be characters, or numbers, or menu items which can be set in each mode. The touch sensing means may be transmissive so that the display 151 can be viewed, and may include a structure for enhancing visibility of the touch screen at a bright place. Referring to FIG. 2A, the touch screen occupies most of the front surface of the front case 101.

The first audio output unit 152 may be implemented as a receiver for transmitting a call sound to a user's ear, or a loud speaker for outputting each type of alarm sound or a playback sound of multimedia.

The front camera 121 processes image frames such as still images or moving images, acquired by an image sensor in a video call mode or a capturing mode. The processed image frames may be displayed on the display 151.

The image frames processed by the front camera 121 may be stored in the memory 160, or may be transmitted to the outside through the wireless communication unit 110. The front camera 121 may be implemented in two or more according to a user's interface.

The user input unit 131 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 131 may be implemented as a dome switch, or a touch screen, or a touch pad for inputting commands or information in a user's push or touch manner. Alternatively, the user input unit 131 may be implemented, for example, as a wheel for rotating a key, a jog, or a joystick. The user input unit 131 is configured to input various commands such as START, END and SCROLL.

A side key 132, an interface unit 170, a microphone, etc. are disposed on the side surface of the front case 101.

The side key 132 may be called 'manipulation unit', and may be configured to receive commands for controlling the operation of the mobile terminal 100. The side key 132 may include any type of ones that can be manipulated in a user's tactile manner. Content input by the side key 132 may be variously set. For instance, through the side key 132, may be input commands such as controlling the front camera 121, controlling the level of sound output from the audio output unit 152, and converting a current mode of the display 151 into a touch recognition mode.

The microphone 122 may be configured to receive a user's voice, other sound, etc.

The interface unit 170 serves a path through which the mobile terminal 100 performs data exchange, etc. with an external device. For example, the interface unit 170 may be at least one of a connection terminal through which the mobile terminal 100 is connected to an ear phone by cable or radio, a port for local area communication, e.g., an infrared data association (IrDA) port, a Bluetooth portion, a wireless LAN port, and power supply terminals for supplying power to the mobile terminal 100. The interface unit 170 may be a card socket for accommodating an external card such as a subscriber identification module (SIM) card, a user identity module (UIM) card or a memory card for storing information.

A power supply unit 190 and a rear camera 121' are disposed on the rear surface of the terminal body.

A flash 123 and a mirror 124 may be disposed close to the rear camera 121'. When capturing an object by using the rear camera 121', the flash 123 provides light onto the object.

When the user captures an image of himself/herself by using the rear camera 121', the mirror 124 can be used for the user to look at himself/herself therein.

The rear camera 121' may face a direction which is opposite to a direction faced by the front camera 121, and may have different pixels from those of the front camera 121.

For example, the front camera 121 may operate with relatively lower pixels (lower resolution). Thus, the front camera 121 may be useful when a user can capture his face and send it to another party during a video call or the like. On the other hand, the rear camera 121' may operate with a relatively higher pixels (higher resolution) such that it can be useful for a user to obtain higher quality pictures for later use. The front camera 121 and the rear camera 121' may be installed at the terminal body so as to rotate or pop-up.

The power supply unit 190 is configured to supply power to the mobile terminal 100. The power supply unit 190 may be mounted in the terminal body, or may be detachably mounted to the terminal body.

When the predetermined touching event is generated on a touch screen 151 that is configured in such a manner that touch for writing input is possible, the controller 180 of a mobile terminal 100, as configured in this manner, according to the present invention, selects the writing sound source corresponding to the generated touching event from the memory 160, and changes a property of the selected writing sound source depending on the pressure and moving speed of the touch applied to the touch screen 151 while the writing input is performed, to provide an audio output module 152 with the generated sound.

At this point, the writing sound source means a sound source or a sound source file that is a result of recording an effect sound that is generated due to a frictional force between a specific writing tool and a surface of specific material, when in an actual analog environment, the writing input is performed on the surface with the writing tool.

One or more writing sound sources may be present, and after recorded in advance in various environments, such as a type of the writing tool, a material of the surface on which to perform the writing input, and a writing condition, they may be stored in the memory 160 in the form of a file.

In addition, at this point, the predetermined touching event that can be generated on the touch screen may be at least one of a touching-down event, a touching and moving event and a touching-up event.

In addition, at this point, the property of the writing sound source means any one of the sound elements of the writing sound source, and, for example, includes a volume of a sound (strength of a sound), a pitch of a sound (highness or lowness of a sound), a tone of a sound (EQ) and the like. When such a property of the writing sound source is changed, at least one of the volume, the pitch, and the tone of the writing sound source is accordingly changed, thereby differentiating the sounds that are output.

Specifically, a change of the property representing the volume is made by changing an amplitude (crest value) of the selected writing sound source. In addition, a change of the property representing the pitch of the sound is made by changing a sampling rate (or frequency value) of the writing sound source. In addition, a change of the property representing the tone of the sound is made by changing a waveform of the selected writing sound.

While the writing input is performed, the controller 180 detects a change in touch information such as the touch point, the touch pressure, the touch area, the touch proximity, and the moving speed of the touch applied to the touch screen 151.

When at least one of items of the touch information detected in this manner is changed, the controller 180 changes at least one property (for example, the volume, the tone, or the pitch) of the selected writing sound source and outputs the changed sound through the audio output module 152 in real time.

Specifically, in a case where the touching-down event is generated on the touch screen 151, the controller 180 selects the writing sound source corresponding to the touching-down event and changes the property representing the volume of the selected writing sound source according to the pressure of the touch applied to the touch screen.

For example, when the touching-down event is generated on the touch screen 151, and the pressure of the touch applied to the touch screen at the time of the touching-down is great, the controller 180 increases and thus outputs the volume of the selected writing sound source. In addition, when the pressure of the touch applied to the touch screen at the time of the touching-down is small, the controller 180 decreases and thus outputs the volume of the selected writing sound source.

In addition, in a case where the touching-down event is generated on the touch screen 151, the controller 180 selects the writing sound source corresponding to the touching-down event and changes the property representing the tone of the selected writing sound source according to the area of the touch that is applied to the touch screen at the time of the touching-down.

For example, when the touching-down event is generated on the touch screen 151, and the areas of the touch applied to the touch screen at the time of the touching-down is narrow, the controller 180 strengthens the sound of a mid band or in a high band in the selected writing sound source, thereby changing the tone. In addition, when the area of the touch applied to the touch screen at the time of the touching-down is broad, the controller 180 strengthens the sound in a low band in the selected writing sound source, thereby changing the tone.

In addition, in a case where the touching and moving event is generated on the touch screen 151, the controller 180 selects the writing sound source corresponding to the touching and moving event, and changes at least one of the properties representing the pitch and the volume of the selected writing sound source according to the moving speed of the touch applied to the touch screen 151.

For example, in a case where the touch applied to the touch screen 151 moves at a very high speed, the controller 180 changes the pitch of the selected writing sound source to a high level and outputs the sound, the volume of which is adjusted to an increased level. In addition, in a case where the touch applied to the touch screen 151 moves at a very slow speed, the controller 180 changes the pitch of the selected writing sound source to a low level and outputs the sound, the volume of which is adjusted to a decreased level.

In addition, in a case where the touching and moving event is generated on the touch screen 151, the controller 180 selects the writing sound source corresponding to the touching and moving event, and changes the property representing the tone of the selected writing sound source according to the pressure of the touch applied to the touch screen.

For example, when the area of the touch applied to the touch screen at the time of the touching and moving is narrow, the controller 180 strengthens the sound in the mid band or in the high band, thereby changing the tone. In addition, when the area of the touch applied to the touch screen at the time of the touching-down is broad, the controller 180 strengthens the sound in the low band in the selected writing sound source, thereby changing the tone.

In addition, in a case where the touching-up event is generated on the touch screen 151, the controller 180 selects the writing sound source corresponding to the touching-up event, and changes the property representing the volume of the selected writing sound source according to the speed at which the touch is released from the touch screen 151.

For example, when the speed at which the touch is released from the touch screen 151 is slow, the controller 180 decreases the volume of the selected writing sound source, and when the speed at which the touch is released from the touch screen 151 is high, the controller 180 adjusts the volume of the selected writing sound source to the increased level, thereby outputting the sound.

In addition, in a case where the touching-up event is generated on the touch screen 151, the controller 180 selects the writing sound source corresponding to the touching-up event, and changes the property representing the tone of the selected writing sound source according to the area of the touch applied immediately before the touch is released from the touch screen 151.

For example, when the area of the touch applied immediately before the touch is released from the touch screen 151 is narrow, the controller 180 changes the tone by strengthening the sound in the mid band or in the high band in the selected writing sound source, and when the area of the touch applied immediately before the touch is released from the touch screen 151 is broad, the controller 180 changes the tone by strengthening the sound in the low band in the selected writing sound source.

On the other hand, when there is no change in the items of detected touch information, the controller 180 reproduces the selected writing sound source as it is. However, when a new touching event is generated on the touch screen 151 or when there is a change in the items of detected touch information, the controller 180 immediately selects another writing sound source or changes at least one property of the selected writing sound source, thereby outputting the result in real time.

In addition, the controller 180 provided the output by overlapping the predetermined background effect sound on the sound generated in this manner. At this point, the predetermined background effect sound refers to a surrounding sound other than the sound that is generated when the predetermined writing tool comes into contact with the predetermined background screen, and includes, for example, an echo effect sound, caused by an influence of resonance.

In addition, the controller 180 selects the specific sound source in this manner, and causes a sound engine (not illustrated) to change at least one property of the selected sound source according to the formation on the detected touch and thus to generate a feedback sound.

The sound engine is configured to include a memory in which to store multiple writing sound sources that are distinguished according to the type of the writing tool, the material of the surface with which the writing tool comes into contact, the writing operation and the like, a first filter for removing a noise included in the writing sound source, a feedback sound generation unit that generates the sound by changing at least one of the volume, and the tone and the pitch of the writing sound source according to the area, the pressure and the moving speed of the touch detected on the touch screen, and a second filter that performs a simulation by overlapping the predetermined effect sound on the generated sound.

According to the embodiment of the present invention, in this manner, the feedback sound is generated and provided in real time, which corresponds to changes in the pressure and the moving speed of the touch while the writing input by the touch is performed on the touch screen 151. This further enables a user to feel as if he/she performed the writing input in an actual analog environment and additionally makes immediate feedback on the various touch inputs possible. Therefore, the user is provided with a further-enhanced sense of reality.

A method of controlling the mobile terminal according to the embodiment of the present invention, which provides the feedback sound according to the change in the touch while the writing input by the touch is performed, is described in detail below, referring to FIGS. 3 to 6.

First, the mobile terminal 100 (refer to FIG. 1) detects the predetermined touching event that is generated on the touch screen configured in such a manner that the touch for the writing input is possible (S310).

At this point, a case where a positional touch for the writing input is possible refers to an environment where, for example, the user can execute a memo application and the like, and then perform the writing input by touching on the touch screen 151 (refer to FIG. 1) with his/her finger or with an input device such as a stylus.

At this time, an effective region of the touch for the writing input may be set in advance according to a predetermined reference. In addition, the example is described here in which the touch for the writing input is performed on the touch screen, but in addition to the touch screen, the touch for the writing input may be performed on a touch pad.

In addition, the predetermined touch screen refers to one of the touching-down event, the touching and moving event, and the touching-up event.

Figure 5:
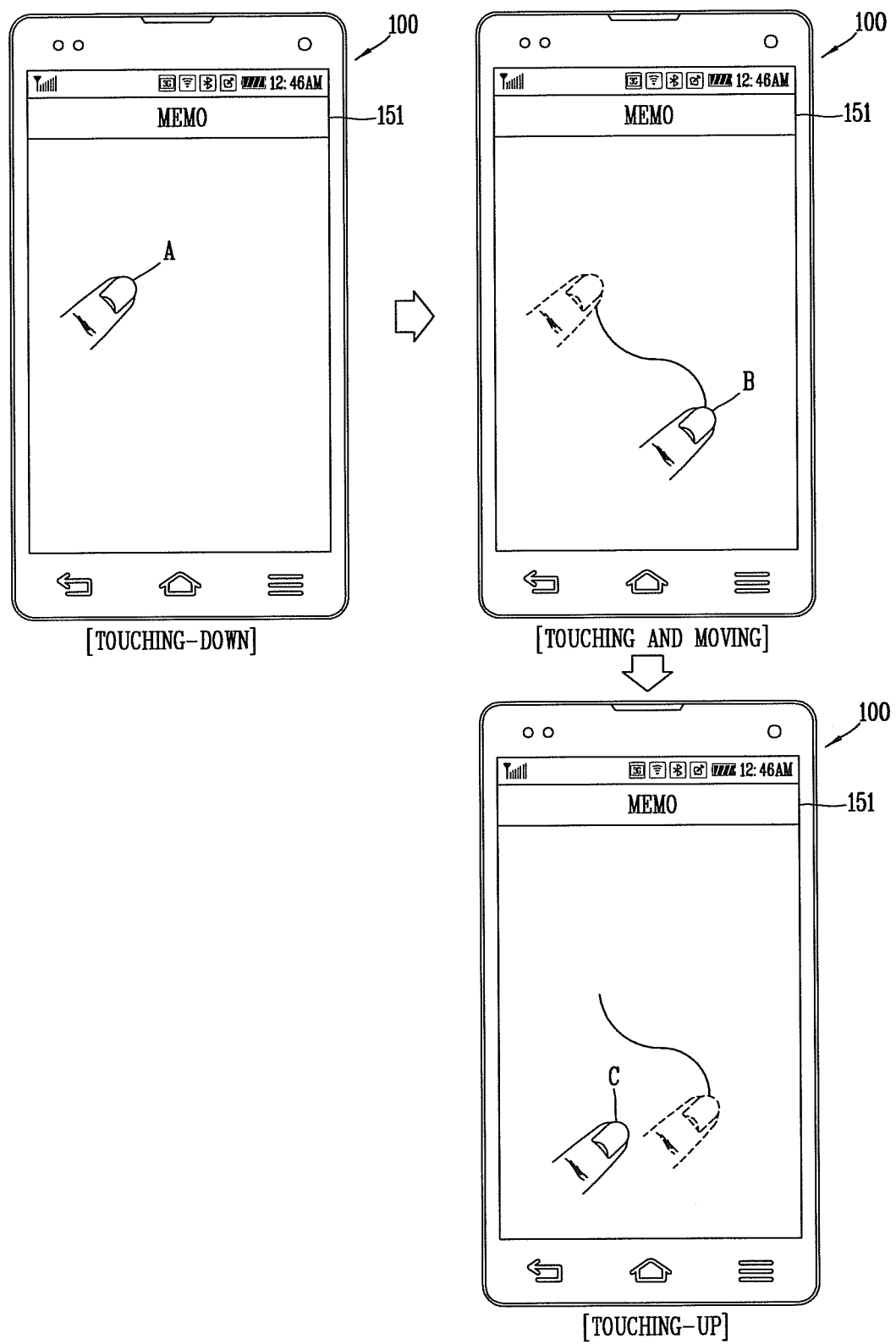
FIG. 5 is views, each illustrating a touching event that is generated on a touch screen for selecting a writing sound source according to the embodiment of the present invention.

Specifically, as illustrated in FIG. 5, the touching-down event means an event A that is generated when the user's finger or the input device such as the stylus touches on the touch screen as illustrated in FIG. 5.

In addition, the touching and moving event refers to an event B that is generated when the user's finger or the input device such as the stylus moves, while touching on the touch screen, as illustrated in FIG. 5.

In addition, the touching-up event represents an event C that is generated when the touch by the user's finger or the input device such as the stylus is released from the touch screen as illustrated FIG. 5.

The touching-down event corresponds to the writing operation that is performed when the writing tool first comes into contact with a specific surface for the writing input. In addition, the touching and moving event corresponds to the writing operation that is performed when the writing tool freely performs the writing input while moving on the specific surface. In addition, the touching-up event corresponds to the writing operation that is performed when the writing tool is released from the specific surface.

Figure 4A:
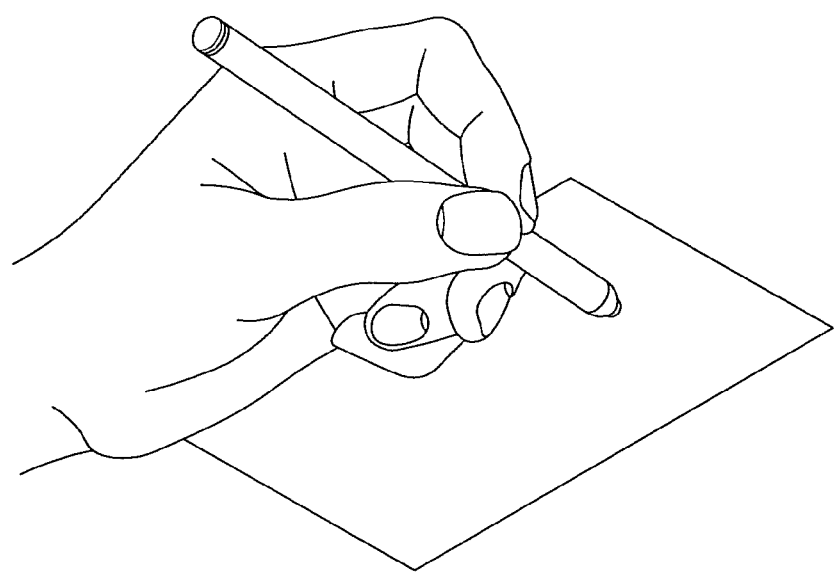
FIGS. 4A and 4B are views, each for describing characteristics of a sound that are distinguishable according to a writing operation event in an analog environment.
Figure 4B:
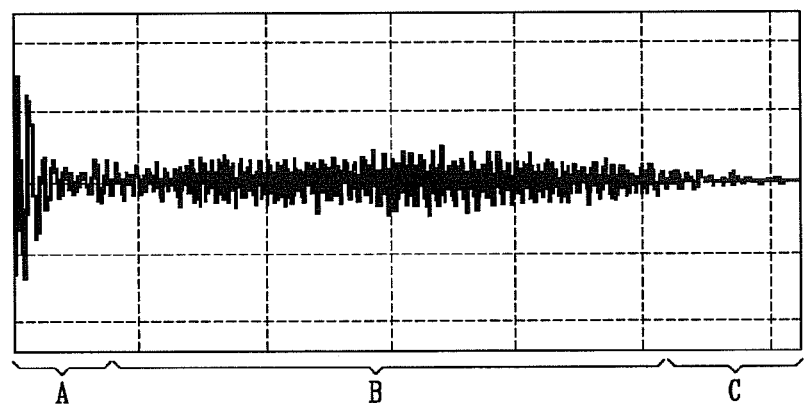

In addition, referring to FIGS. 4A and 4B, it is apparent that when the writing input by the writing tool is performed in the actual analog environment as illustrated in FIG. 4A, for example, a sound A that is generated when a pointed part of the writing tool first comes into contact with the surface of paper, a sound B that is generated when the pointed part moves while in contact with the surface, and a sound C that is generated when the pointed part is released from the surface are different in characteristic, as illustrated in FIG. 4B.

According to the embodiment of the present invention, the events are configured to have their respective different writing sound sources, on the assumption that the sounds depending on the writing operations are different in characteristic.

When the touching event that is predetermined in this manner is detected, the writing sound source corresponding to the generated touching event is selected from the memory (S320).

The memory 160 (refer to FIG. 1), stores in advance the multiple different writing sound sources corresponding to the touching events. In addition, the memory 160 may store in advance the multiple different writing sound sources that correspond to the touching events according to the type of the writing tool and/or the material of the specific surface with which the writing tool comes into contact.

The controller 180 selects the writing sound source corresponding to the detected touching event from the memory 160. At this point, only the writing sound sources that correspond to some of the touching events according to the specific type of the writing tool and/or the material of the specific surface with which the writing tool comes into contact may be stored in the memory 160.

For example, only the writing sound source corresponding to the touching and moving may be present as the writing sound source for the specific writing tool, and the writing sound sources corresponding to the touching-down event and the touching-up event may be omitted.

When such a writing sound source corresponding to the touching event is selected, the controller 180 changes a first property of the selected writing sound source according to the pressure of the touch applied to the touch screen while the writing input is performed (S330).

That is, the controller 180 detects the pressure of the touch applied to the touch screen, and changes the first property of the writing sound source according to an amount of the detected pressure.

At this point, the property of the writing sound source here means one of the sound elements of the writing sound source, as described above, and, for example, refers to the volume of the sound (strength of the sound), and the pitch of the sound (state of the sound), the tone of the sound (EQ) and the like. When the property of the writing sound source is changed, at least one of the volume, the pitch, and the tone of the writing sound source is changed, and thus a different sound is generated.

In addition, the first property here is a property that represents the volume of the writing sound source.

When the pressure of the touch applied to the touch screen 151 is increased, the controller 180 increases a value of the first property of the writing sound source, thereby increasing the volume of the selected writing sound source. In addition, when the pressure of the touch applied to the touch screen 151 is decreased, the controller 180 decreases a value of the first property of the writing sound source, thereby decreasing the volume of the selected writing sound source.

In addition, when the moving of the touch applied to the touch screen 151 is detected while the writing sound source corresponding to the event is selected and the writing input is performed, at least one of the first property and a second property of the selected writing sound source is changed according to the detected moving speed (S340).

The second property here is a property that represents the tone or the pitch of the writing sound source. The tone refers to an image of the sound, and the change in such a tone is obtained by changing a waveform of the sound. In addition, the pitch refers to the highness or lowness of the sound, and the change in such a pitch is made by changing a frequency of the sound, and is made here by changing the sampling rate of the writing sound source.

Figure 6:
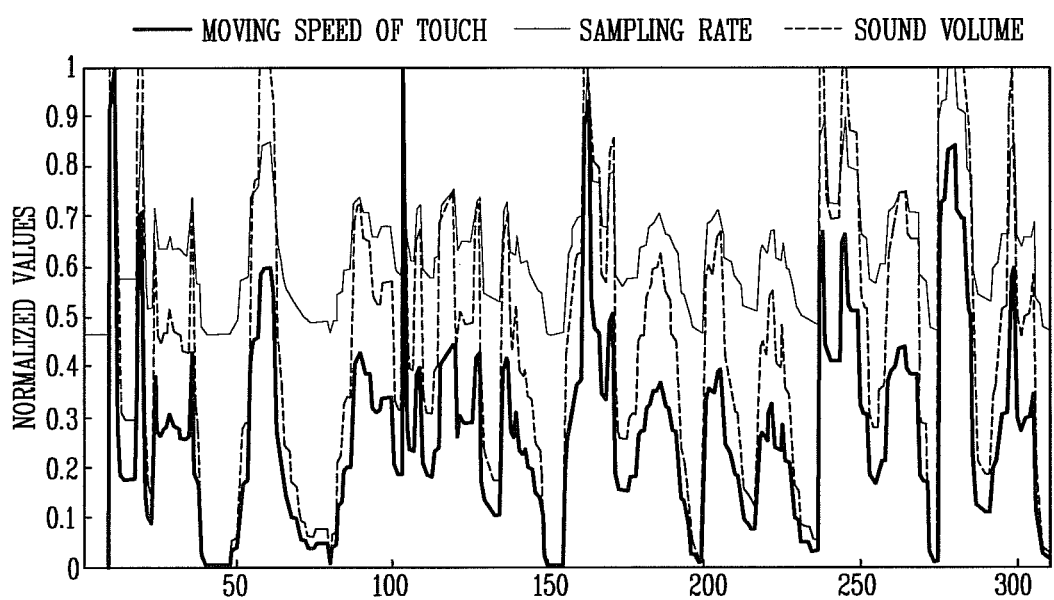
FIG. 6 is a graph showing how a sampling rate and a volume of the writing sound source change depending on a moving speed of the touch according to the embodiment of the present invention.

With regard to this, FIG. 6 illustrates a graph showing that the sampling rate and the volume of the writing sound source are changed according to the moving speed of the touch. As illustrated, the sampling rate B of the writing sound source is changed in real time according to the change in the moving speed A of the touch for the writing input, and thus the pitch (highness or lowness of the sound) of the writing sound source is changed. The volume C of the writing sound source is changed in real time according to the change in the moving speed A of the touch, and thus the sound is changed.

On the other hand, when the pressure and the pressure of the touch applied to the touch screen 151 are all increased, the controller 180 increases the values of the first property and the second property of the writing sound source. In addition, the moving speed of the touch applied to the touch screen 151 is increased/decreased, the controller 180 accordingly increases/decreases at least one of the values of the first property and the second property of the writing sound source. In addition, when the pressure and the pressure of the touch applied to the touch screen 151 are all decreased, the controller 180 decreases the values of the first property and the second property of the writing sound source at the same time.

For example, when the pressure and the moving speed of the touch applied to the touch screen 151 are all increased, the controller 180 increases the volume of the selected writing sound source (change in the volume) and increases the highness of the sound (change in the pitch).

The sound generated in this manner is output in real time through the audio output module 152 (S350). That is, the controller 180 outputs the sound that is changed according to the change of the touch that is applied to the touch screen 151 while the writing input is performed. Thus, the user is provided with a real metaphor sound environment.

In addition, Steps S310 to S340, described above, are not necessarily performed in order in which the number increases. For example, when the writing sound source that is changed according to the pressure and/or the moving speed of the touch is outputted, and then another predetermined touching event is generated on the touch screen 151, the controller 180 selects another writing sound source, which corresponds to the generated touching event, from the memory 160.

As described above, according to the embodiment of the present invention, one of the multiple writing sound sources is selected according to the touching event corresponding to the writing operation in the environment where the touch for the writing input to the touch screen is possible, and when the pressure and/or the moving speed of the touch is changed while the writing input is performed, the sound is output in which the property, such as the volume, the tone, and the pitch of the selected writing sound source, is changed. This enables the use to feel as if he/she performed the writing input in the actual analog environment. Therefore, the user is provided with a further-enhanced sense of reality.

Figure 7:
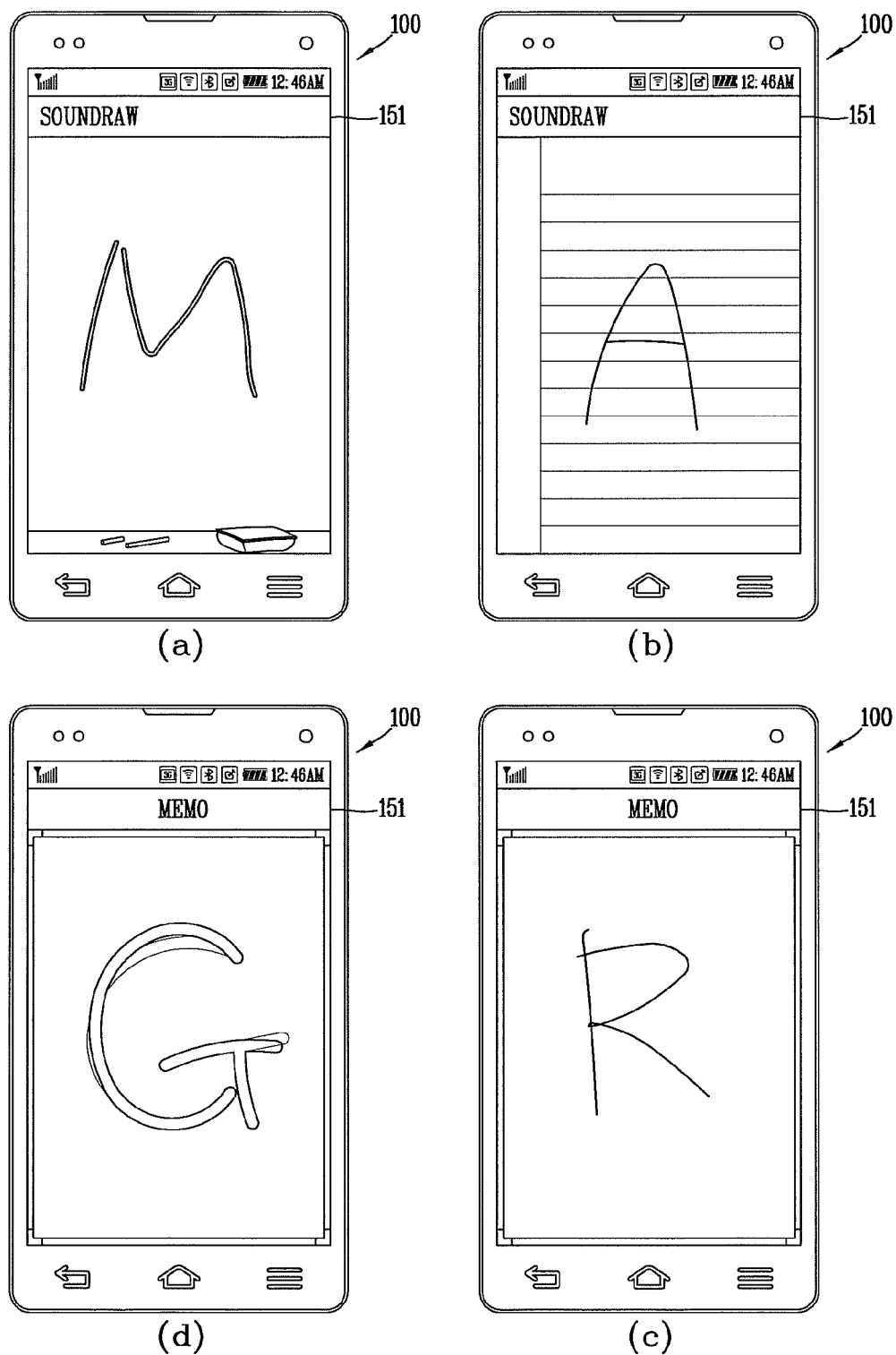
FIG. 7 is views, each illustrating an example in which a visual effect of the touch varies depending on a predetermined writing tool and a background screen according to the embodiment of the present invention.
Figure 10:
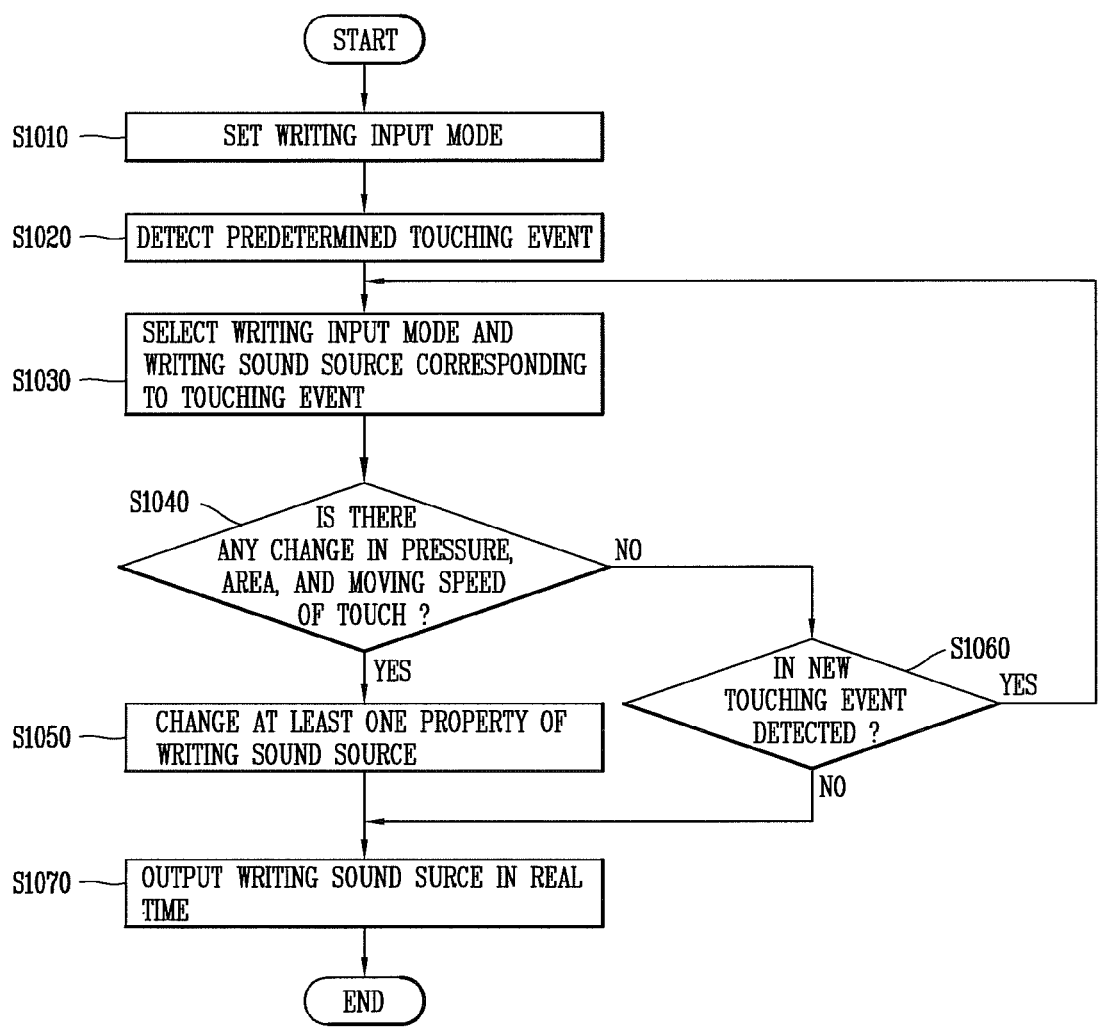
FIG. 10 is a flowchart for describing a method of outputting the feedback sound that corresponds to the touch depending on the predetermined writing tool and/or the background screen, according to the embodiment of the present invention.

From now on, a method of outputting the feedback sound described above when the writing tool and/or the background screen varies is described referring to FIGS. 1, 7 and 10.

As illustrated in FIG. 10, the controller 180 (refer to FIG. 1) according to the embodiment of the present invention first sets at least one of the writing tool for the writing input and the background screen according to the predetermined reference (S1010).

The setting according to the predetermined reference here includes an automatic setting according to a user input or a type of application, an automatic setting of a specific background screen according to a type of selected writing tool, and an automatic setting of a limited type of writing tool according to the selected background screen.

To do this, the controller 180 includes a writing input mode setting unit (not illustrated) for setting at least one of the writing tool for the writing input and the background screen according to the predetermined reference.

The writing tool selectable in the writing input mode setting unit (not illustrated), for example, includes a pencil, a pen, a writing brush, a stick, a colored pencil, a crayon, a marking pen, a chalk, a marking pen for a whiteboard, an eraser, and the like. In addition, the background screen selectable, for example, includes screens, on each of which earth, paper, a blackboard, plastics, glass, snow, and the like are expressed.

Such a writing input mode setting unit performs setting, changing, deleting, and the like for at least one of the writing tool and the background screen through the user input. To do this, a user interface for setting, changing and deleting the writing tool and/or the background screen is displayed on at least one region of the touch screen 151.

In addition, the writing input mode setting unit changes a color, a thickness, a font, and the like of the writing tool that is predetermined according to the predetermined reference, or sets or changes a brightness, a sense of touch, a frictional force and the like of the predetermined background screen.

The information changed by such a writing input mode setting unit is provided for the controller 180, and, as described below, is used in selecting the writing sound source, and/or changing the property of the selected writing source source.

In addition, the touch screen 151 (refer to FIG. 1) outputs the visual effect for the writing input differently, based on the information changed by the writing input mode setting unit. For example, when the writing tool is set to "hand" and the background screen is changed from "earth" to "snow," the touch screen 151 screen-switches the background screen to "snow" background screen, and changes the visual effect of the writing input according to the touch, which is output to the touch screen 151, from an "earth-digging effect" to a snow-melting effect. In addition, an animation effect in association with this is output as well.

With regard to this, FIG. 7 is views, each illustrating an example in which the visual effect of the touch for the writing input varies according to the set writing tool and the set background screen. FIG. 7A is the view illustrating the example in which the writing tool is set to "chalk," and the background screen is set to "black board." FIG. 7B is the view illustrating the example in which the writing tool is set to "pencil," and the background screen is set to "paper." In addition, FIG. 7C is the view illustrating the example in which the writing tool is set to "marking pen for a whiteboard," and the background screen is set to "white board." FIG. 7D is the view illustrating the example in which the writing tool is set to "eraser."

This setting of the writing tool and/or the background screen may be performed by the user input, or the specific writing tool and the background screen may be initially predetermined. In addition, when the predetermined writing tool is for writing deletion, not for the writing input, the visual effect and the feedback sound effect in the region on which the writing input is performed may be different from the visual effect and the feedback sound effect in a region other than the region on which the writing input is performed.

When the visual effect is changed in this manner, the changed effect sound is applied to the selected writing sound source, as described below.

On the other hand, the writing sound source files, the number of which is proportional to the number of the writing tools and the background screens that can be set by the writing input mode setting unit, are stored in advance in the memory 160 (refer to FIG. 1). That is, the writing sound source files, which are as many as the number of maximum possible combinations of the writing tools and the background screens multiplied by the number of the touching events, are stored in advance in the memory 160. For example, even though the set writing tools are the same pencil, the writing sound sources corresponding to the touching events are different, depending on whether the background screen is the blackboard, or the paper.

When the specific writing tool and/or the background screen are set in this manner, the controller 180 detects the predetermined touching event that is generated on the touch screen 151 for the writing input (S1020). At this point, the predetermined touch screen refers to one of the touching-down event, the touching and moving event and the touching-up event.

When the touching predetermined in this manner event is detected, the controller 180 selects the writing sound source corresponding to the generated touching event according to the set writing tool, and/or the set background screen, from the memory 160 (refer to FIG. 1) (S1030).

For example, even though the same touching-down events are generated, when the set writing tools are different, the different writing sound sources can be selected from the memory 160.

When the writing sound source corresponding to the touching event is selected in this manner, the controller 180 detects the pressure, the area, and the moving speed of the touch applied to the touch screen while the writing input is performed (S1040).

When the change is detected, the controller 180 changes at least one property of the selected writing sound source (S1050). At this point, the property of the writing sound source means any one of the sound elements of the writing sound source, and, for example, includes the volume of the sound (strength of the sound), the pitch of the sound (highness or lowness of the sound), the tone of the sound (EQ) and the like.

On the other hand, according to the embodiment, when the thickness of the set writing tool varies according to a writing pressure, the controller 180 changes the property representing the tone of the selected writing sound source according to the pressure of the touch applied to the touch screen 151, and the controller 180 additionally provides the output for the touch screen 151 by adjusting the thickness of the writing input according to the pressure of the touch applied to the touch screen 151.

For example, when the pressure of the touch applied to the touch screen 151 is increased, the controller 180 strengthens the sound in the low bank of the selected writing sound source, thereby changing the tone. In addition, when the pressure of the touch applied to the touch screen 151 is decreased, the controller 180 strengthens the sound in the mid bank or in the high band of the selected writing sound source, thereby changing the tone.

In addition, in a case where the material of the set background screen varies in a sense of touch according to the writing pressure, the controller 180 provides the output by overlapping a different effect sound on the selected writing sound source according to the pressure of the touch applied to the touch screen 151 while the writing input is performed.

For example, in a case where the set background screen is the water, when the pressure of the touch applied to the touch screen 151 is increased, the controller 180 overlaps an effect sound, which is "deep" in a sense of depth, on the selected writing sound source. In addition, when the pressure of the touch applied to the touch screen 151 is decreased, the controller 180 overlaps the effect sound, which is "shallow" in a sense of depth, on the selected writing sound source.

On the other hand, even in a case where the set writing tool and/or the set background screen take a different color, a different font, a different sense of touch, and a different frictional force according to the writing speed, the output is provided in a similar manner by changing the property of the selected writing sound source, or by overlapping the uniform effect sound on the selected writing sound source.

In addition, when at least one of the set writing tool and the set background screen varies, the controller 180 changes at least one property of the selected writing sound source to a level different from a previous level, according to the area, the pressure, and the moving speed of the touch that is detected when the set writing tool touches on the background screen.

For example, in a case where even though pressure values of the detected touches are the same, the writing tool is changed from "pencil" to "charcoal," the controller 180 sets the extent to which the volume of the selected writing sound source is changed, to a greater value.

On the other hand, the controller 180 generates another sound by changing the property of the selected writing sound source differently or by applying the predetermined effect sound to the selected writing sound source, according to an amount of a virtual frictional force that is generated when the set writing tool comes into contact with the set background screen.

In this case, the controller 180 additionally outputs a vibration effect corresponding to the amount of the virtual frictional force to the touch screen 151. This enables the user to feel the feedback sound effect and the feedback vibration effect that correspond to the touch, at the same time, while the writing input is performed. Therefore, the user is provided with a further-improved sense of reality.

The writing sound source that is changed in this manner is output in real time through the audio output module 152 (S1070).

On the other hand, when no change in the touch is detected in Step S1040, it is determined whether a new touching event is generated (S1060), and when as a result of the determination, the predetermined touching event is detected, the returning back to Step S1030 takes place, and the steps described above are repeated.

In a case where there is no change in the detected touch in Step S1040, and the new touching event is not generated even in Step S1060, the selected writing sound source is reproduced, as it is, without any change (S1070).

As described above, the feedback sound on the writing input that is performed in various environments is reproduced with a further-enhanced sense of reality, by setting at least one of the writing tool and the background screen according to the predetermined reference, and by making different the extents to which the writing sound source, selected according to the set writing tool and/or the set background screen, and the property of the selected writing sound source are changed.

The method of outputting the feedback sound corresponding to the touch for the writing input is described above. From now on, the feedback sound corresponding to the user input that is applied to the mobile terminal 100 (refer to FIG. 1) in an environment other than the writing input environment is described in detail, referring to FIGS. 8A to 9C.

Figure 8A:
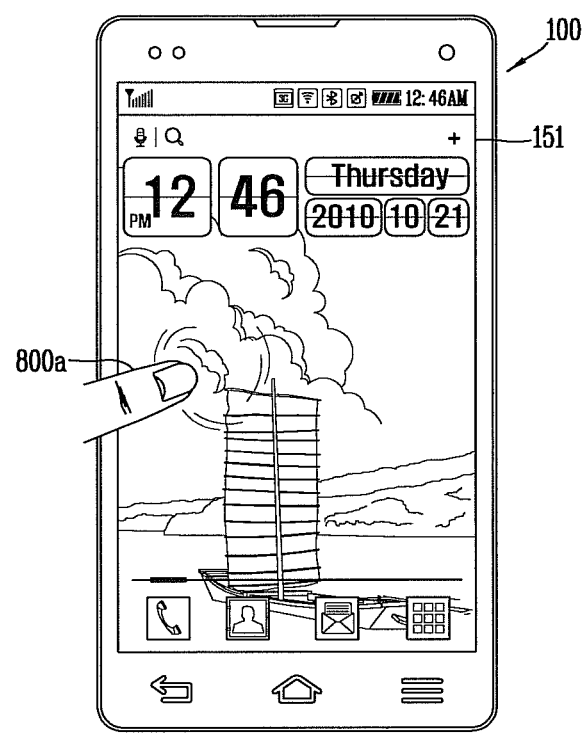
FIGS. 8A to 9C are views, each for describing the sound feedback sound with respect to the touch, not the writing input, according to the embodiment of the present invention.

First, FIG. 8A illustrates an example in which the feedback sound effect for displaying a locked state is output. In the example, the feedback sound is output that is generated by selecting the different sound source or changing the property (for example, the volume, the tone, and the pitch) of the selected sound source, according to the pressure, the area, and/or the moving speed of the patch detected on the touch screen 151.

The locked state here is a state in which the input of a control command by the user to applications included in the mobile terminal 100 is limited, and serves a purpose to prevent the user from inputting an unintended control command and thus activating or deactivating the applications.

The controller 180 sets at least one material to be applied to the screen in the locked state. When the material for the screen in the locked state is set in this manner, and the touch is detected on the touch screen 151 in the locked state, the controller 180 outputs the feedback sound effect as if the touch was performed on the set material.

For example, in a case where the material for the screen in the locked state is set as "water," in FIG. 8A, the output is provided by applying the sense of depth that changes according to the pressure of the touch 800a applied to the touch screen 151, or by selecting the sound source in which a "wave" effect sound that changes according to the moving speed of the touch 800*a* applied to the touch screen 151, or by changing the property of the selected sound source.

Figure 8B:
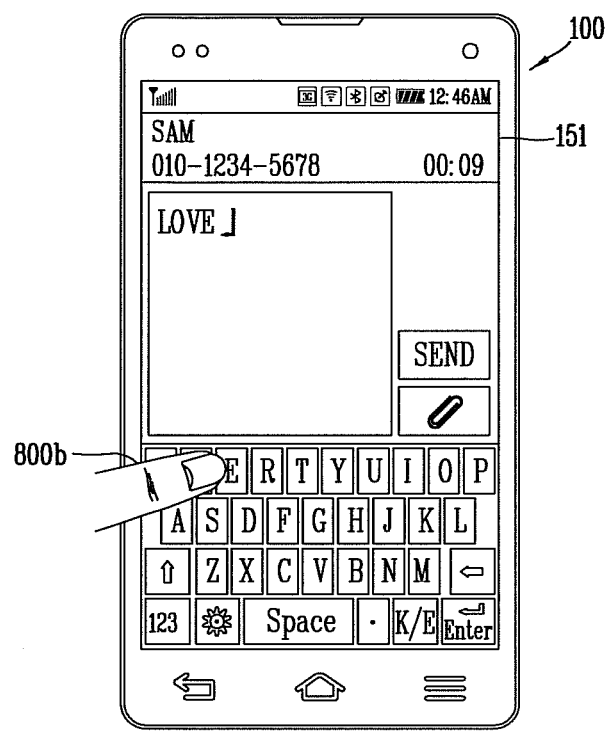

In addition, FIG. 8B illustrates an example in which to output the feedback sound effect corresponding to the typing through the use of a touch keyboard. In the example, a strength of the typing in the touch keyboard is expressed by outputting the different sound source according to the pressure of the touch 800*b* applied to a specific key in the touch keyboard, or by changing and outputting the property (for example, the volume, the tone, and the pitch) of the sound source.

Figure 8C:
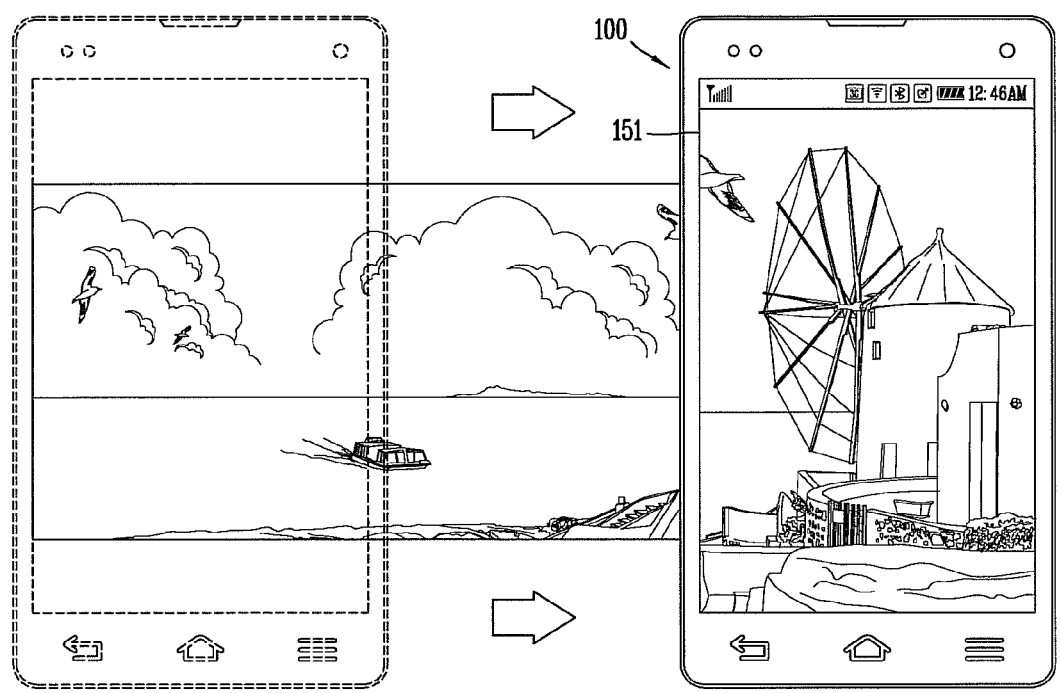

In addition, FIG. 8C illustrates an example in which to output the feedback sound effect corresponding to the motion of the mobile terminal 100 when the panoramic shooting is performed using the mobile terminal 100.

The panoramic shooting is guided through the use of the feedback effect sound by adjusting and outputting at least one of the volume, the tone, and the pitch of the effect sound that is determined according to the moving speed of the mobile terminal 100 that moves when the panoramic shooting is performed.

Figure 9A:
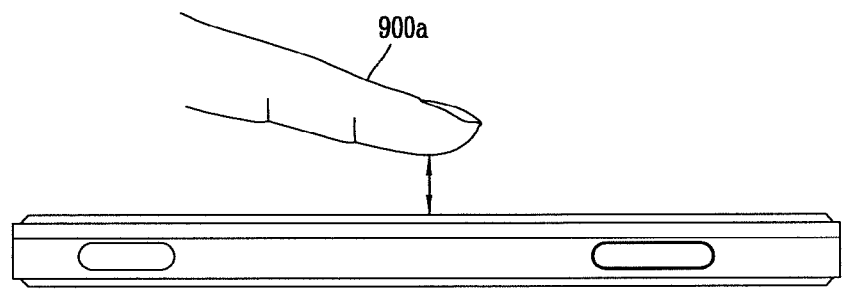

FIG. 9A illustrates an example in which to output the feedback sound effect corresponding to the touch 900*a* moving to and from the touch screen 151 of the mobile terminal 100 configured in such a manner that a three-dimensional touch is possible. For example, the feedback sound with a high sense of reality is output by selecting the different sound source from the memory 150 (refer to FIG. 1) according to a distance between the three-dimensional touch 900*a* and the touch screen 151, and/or a speed at which the three-dimensional touch 900*a* moves to and from the touch screen 151, or by changing the property (for example, the volume, the tone, and the pitch) of the selected sound source.

Figure 9B:
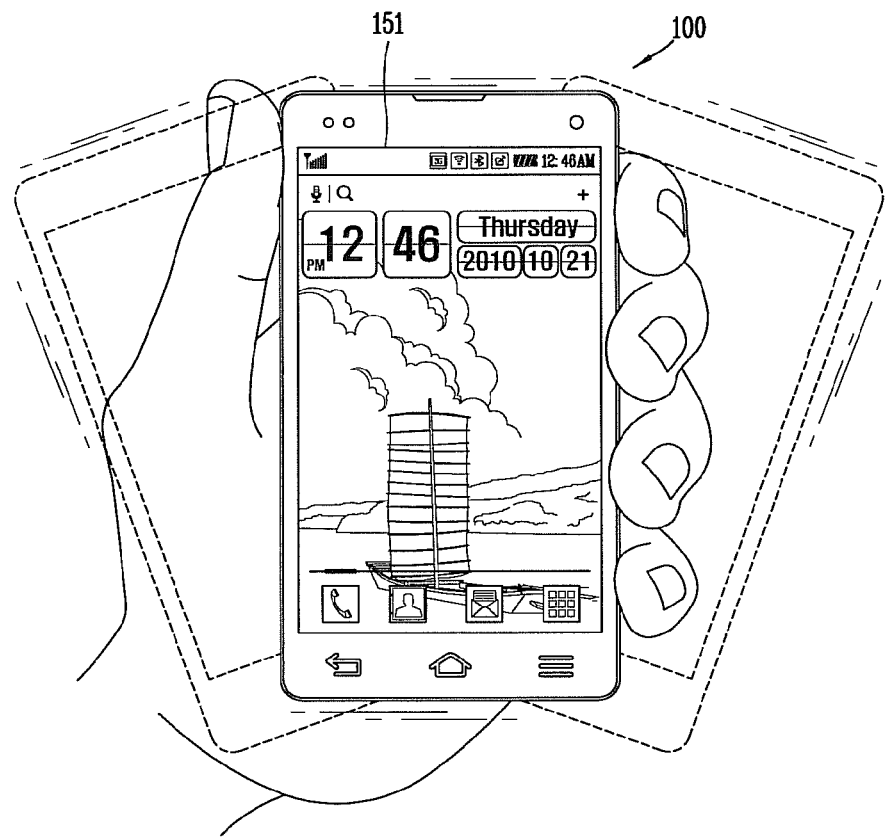

FIG. 9B illustrates an example in which to output the feedback sound effect corresponding to a user's gesture, for example, a speed at which the mobile terminal 100 is shaken. For example, when the speed at which the mobile terminal 100 is shaken is increased, values of the volume and/or the pitch of the specific sound source are increased, and when the speed at which the mobile terminal 100 is shaken is decreased, the values of the volume and/or the pitch of the specific sound source are decreased. Therefore, the feedback sound effect that is high in the sense of reality is obtained.

Figure 9C:
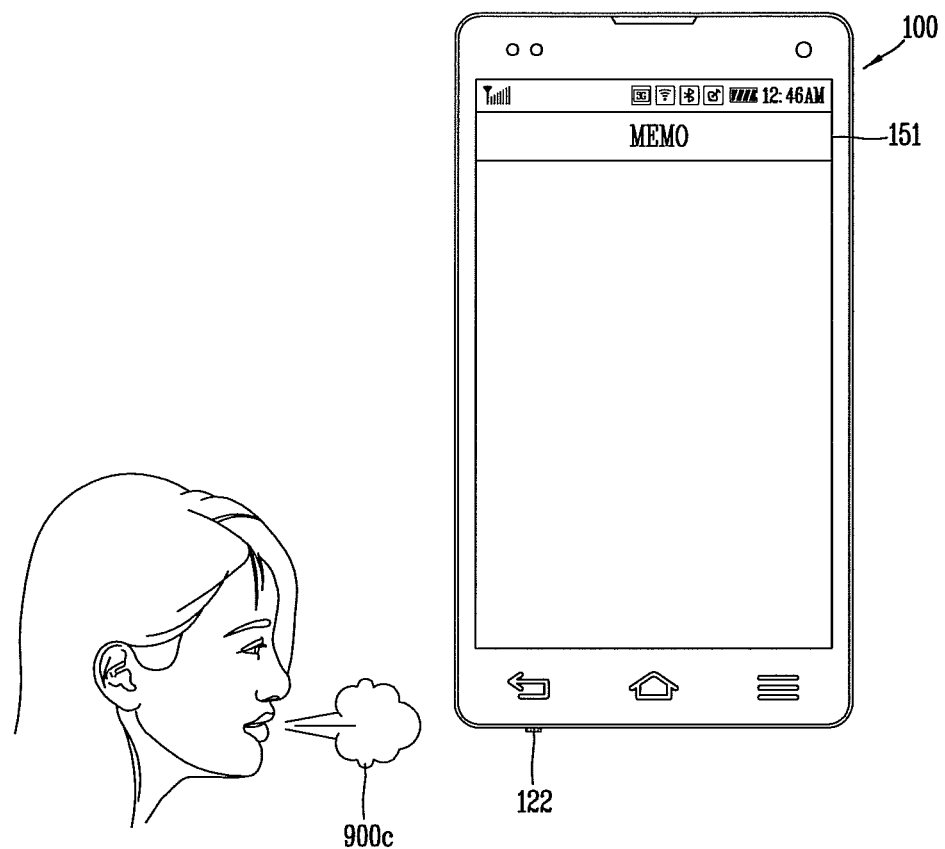

In addition, FIG. 9C illustrates an example in which to output the feedback sound effect corresponding to a strength of a wind that is input through a microphone 122 (refer to FIG. 1) of the mobile terminal, or the sound effect of the writing input corresponding to the sound property of a voice (for example, the volume, the tone, and the pitch of the voice).

For example, when the strength of the wind that is input through the microphone 122 is increased, the values of the volume and/or the pitch of the specific sound source are increased, and when the strength of the wind that is input through the microphone 122 is decreased, the values of the volume and/or the pitch of the specific sound source are decreased. As a result, the feedback sound effect is obtained.

In addition, according to another embodiment, the controller 180 converts a user's voice signal, input through the microphone 122 of the mobile terminal, to a signal corresponding to the touch for the writing input. To do this, the controller 180 may include a signal conversion unit (not illustrated).

When this is done, the controller 180 changes the pressure of the input, applied to the touch screen 151, according to a size of the user's voice signal, which is input through the microphone 122. In addition, the controller 180 changes the moving speed of the touch applied to the touch screen 151, according to a speed at which the user's voice signal is input to the microphone 122. Thus, the sound effect of the writing input is output by changing at least one property (for example, the volume, the tone, and the pitch) of the writing sound source.

In addition, the controller 180 detects, for example, touch points of multi touches, applied to the touch screen 151, and predetermined touch patterns, although they are not illustrated, and when detecting the change, the controller 180 outputs the feedback sound effect by changing at least one property (for example, the volume, the tone, and the pitch) of the selected sound source.

The sound source relating to the feedback sound for the touch described above may be stored in advance in the memory 160 (refer to FIG. 1). Thus, the controller 180 selects and changes the specific sound source corresponding to the detected touch or the user's motion from the stored multiple sound sources.

As described above, in the mobile terminal and the method of controlling the mobile terminal according to the embodiment of the present invention, when the touching event for the touch input to the touch screen is generated, the writing sound source corresponding to the generated touching event is selected from the memory, and the feedback sound is generated by changing the sound property of the writing sound source that is selected according to the pressure of the touch applied to the touch screen and the moving speed of the touch. This enables the user to feel as if he/she performed the writing input in the actual analog environment, and provides the user with a yearning for the analog environment and a pleasure to experience it.

In addition, according to one embodiment disclosed in the present description, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a touch screen configured to receive a touch;
    a sound output unit configured to output a sound; and
    a controller configured to:
        display, on the touch screen, a background screen;
        receive, via the touch screen, a touch while the background screen is displayed on the touch screen;
        detect, a first touching event corresponding to the first touch, from among a plurality of touching events, wherein the plurality of touching events includes a touching-down event, a touching and moving event and a touching-up event;
        select, from a memory, a first writing sound source associated with the first touching event corresponding to the touch, wherein the plurality of touching events are respectively associated with different writing sound sources;
        output, via the sound output unit, the first writing sound source in response to the touch,
        detect, a second touching event corresponding to the touch, which is different from the first touch event;
        select, from the memory, a second writing sound source associated with the second touch event;
        output, via the sound output unit, the second writing sound source in response to the touch,
    wherein the touching-down event corresponds to an operation that is performed when the touch is first detected on the touch screen, the touching and moving event corresponds to an operation that is performed when the touch is moving on the touch screen, and the touching-up event corresponds to an operation that is performed when the touch is released from the touch screen,
    wherein the controller is further configured to:
        change volume of the first writing sound source according to a pressure of the touch when the first touch event is the touching-down event or the touching-up event;
        change at least one of the volume, a tone and a pitch of the writing sound source based on moving speed of the touch when the second touch event is the touching and moving event; and
        change at least one of the volume, a tone and a pitch of the writing sound source based on a material of the background screen when the material of the background screen varies in a sense of touch according to the writing pressure.

2. The mobile terminal according to claim 1,
    wherein when the touching event is the touching-down event, the controller selects the writing sound source corresponding to the touching-down event, and the controller changes the tone of the selected writing sound source based on an area of the touch to the touch screen, and the controller generates the sound based on the changed tone.

3. The mobile terminal according to claim 1,
    wherein when the touching event is the touching and moving event, the controller selects the writing sound source corresponding to the touching and moving event, and changes the tone of the selected writing sound source based on a pressure of the touch applied to the touch screen, and changes at least one of the pitch and the volume of the selected writing sound source based on a moving speed of the touch to the touch screen, and the controller generates the sound based on the changed at least one of the pitch and the volume.

4. The mobile terminal according to claim 1,
    wherein when the touching event is the touching-up event, the controller selects the writing sound source corresponding to the touching-up event, and changes the volume of the selected writing sound source based on a speed at which the touch is released from the touch screen, and the controller generates the sound based on the changed volume.

5. The mobile terminal according to claim 1,
    wherein when the touching event is the touching-up event, the controller selects the writing sound source corresponding to the touching-up event, and changes the tone of the selected writing sound source based on an area of the touch applied immediately before the touch is released from the touch screen, and the controller generates the sound based on the changed tone.

6. The mobile terminal according to claim 1, wherein in response to an increase of a pressure of the touch, the controller increases a value of the selected writing sound source, and
    in response to a decrease of the pressure of the touch to the touch screen, the controller decreases the value of the volume of the selected writing sound source.

7. The mobile terminal according to claim 6,
    in response to an increase of a pressure and the moving speed of the touch, the controller increases values of the at least one of a volume, a tone and a pitch of the selected writing sound source,
    in response to increase/decrease of the moving speed of the touch, the controller increases/decreases at least one of the values of the at least one of a volume, a tone and a pitch of the selected writing sound source, and
    in response to a decrease of the pressure and the moving speed of the touch, the controller decreases, at a same time, the values of the at least one of a volume, a tone and a pitch of the selected writing sound source.

8. The mobile terminal according to claim 1,
    wherein the controller includes a touch mode setting unit to set at least one of a writing tool for the touch, and a background screen according to a predetermined reference.

9. The mobile terminal according to claim 8,
wherein the memory stores the generated sound, the number of which is proportional to the number of the set writing tools and the set background screens.

10. The mobile terminal according to claim 8,
wherein in response to the predetermined touching event to occur at the touch screen, the controller selects the different writing sound sources based on the set writing tool and the set background screen.

11. The mobile terminal according to claim 10,
wherein when a thickness of the set writing tool varies according to a writing pressure, the controller provides an output to the touch screen by adjusting a thickness of text according to the pressure of the touch when the set writing tool touches the touch screen while the touch is performed, and provides the sound by changing the tone of the selected writing sound source.

12. The mobile terminal according to claim 11,
wherein in response to an increase of the pressure of the touch to the touch screen, the controller changes the tone by strengthening a sound in a low band in the selected writing sound source, and
in response to a decrease of the pressure of the touch applied to the touch screen, the controller changes the tone by strengthening a sound in a mid band or in a high band in the selected writing sound source.

13. The mobile terminal according to claim 1,
wherein when at least one of the writing tool and the background screen is set differently, the touch screen outputs a visual effect of the touch for the touch differently, and the controller changes at least one property of the selected writing sound source differently according to an area, a pressure, and a moving speed of the touch when the set writing tool touches the background screen.

14. The mobile terminal according to claim 1,
wherein the controller provides a vibration effect corresponding to the amount of the virtual frictional force.

15. The mobile terminal according to claim 1, further comprising:
a signal conversion unit for converting a user voice signal to a signal corresponding to the touch for text.

16. The mobile terminal according to claim 15,
wherein the controller changes the property of the selected writing sound source by changing a pressure of the touch to the touch screen based on a size of the input user voice signal and changing the moving speed of the touch to the touch screen according to a speed at which the user voice signal is input.

17. A method of controlling a mobile terminal, the method comprising:
displaying, on a touch screen of the mobile terminal, a background screen;
receiving a touch, via the touch screen while the background screen is displayed on the touch screen;
detecting, a first touching event corresponding to the touch, from among a plurality of touching events, wherein the plurality of touching events includes a touching-down event, a touching and moving event and a touching-up event;
selecting, from a memory, a writing sound source associated with the first touching event;
outputting, via a sound output unit, the first writing sound source in response to the touch;
detecting, a second touching event corresponding to the touch, which is different from the first touch event;
selecting, from the memory, a second writing sound source associated with the second touch event;
outputting, via the sound output unit, the second writing sound source in response to the touch,
wherein the touching-down event corresponds to an operation that is performed when the touch is first detected on the touch screen, the touching and moving event corresponds to an operation that is performed when the touch is moving on the touch screen, and the touching-up event corresponds to an operation that is performed when the touch is released from the touch screen,
wherein the method further comprises:
changing volume of the first writing sound source according to a pressure of the touch when the first touch event is the touching-down event or the touching-up event;
changing at least one of the volume, a tone and a pitch of the writing sound source based on moving speed of the touch when the second touch event is touching and moving event; and
changing at least one of the volume, a tone and a pitch of the writing sound source based on a material of the background screen when the material of the background screen varies in a sense of touch according to the writing pressure.

* * * * *